(12) United States Patent
Neet

(10) Patent No.: US 9,555,712 B2
(45) Date of Patent: Jan. 31, 2017

(54) VEHICLE SYSTEM WITH BATTERIES IN SERIES

(71) Applicant: REMY TECHNOLOGIES, L.L.C., Pendleton, IN (US)

(72) Inventor: Kirk Neet, Pendleton, IN (US)

(73) Assignee: REMY TECHNOLOGIES, L.L.C., Pendleton, IN (US)

( * ) Notice: Subject to any disclaimer, the term of this patent is extended or adjusted under 35 U.S.C. 154(b) by 183 days.

(21) Appl. No.: 14/211,209

(22) Filed: Mar. 14, 2014

(65) Prior Publication Data

US 2014/0266043 A1    Sep. 18, 2014

Related U.S. Application Data

(60) Provisional application No. 61/791,347, filed on Mar. 15, 2013.

(51) Int. Cl.
| | |
|---|---|
| *H02J 7/00* | (2006.01) |
| *B60L 11/14* | (2006.01) |
| *B60L 11/18* | (2006.01) |
| *B60L 15/00* | (2006.01) |
| *B60L 15/20* | (2006.01) |

(52) U.S. Cl.
CPC ............ *B60L 11/14* (2013.01); *B60L 11/1853* (2013.01); *B60L 11/1864* (2013.01); *B60L 11/1868* (2013.01); *B60L 15/007* (2013.01); *B60L 15/20* (2013.01); *B60L 2210/30* (2013.01); *B60L 2240/427* (2013.01); *B60L 2240/441* (2013.01); *B60L 2240/547* (2013.01); *Y02T 10/645* (2013.01); *Y02T 10/70* (2013.01); *Y02T 10/7005* (2013.01); *Y02T 10/7061* (2013.01); *Y02T 10/7066* (2013.01); *Y02T 10/7077* (2013.01); *Y02T 10/7241* (2013.01); *Y02T 10/7275* (2013.01)

(58) Field of Classification Search
CPC ... B60L 11/1864; B60L 11/1868; B60L 15/20; B60L 2210/30; B60L 2240/427; B60L 2240/441; B60L 2240/547; Y02T 10/7005; Y02T 10/7077; Y02T 10/7241; H02P 21/0085
USPC ......................................................... 320/109
See application file for complete search history.

(56) References Cited

U.S. PATENT DOCUMENTS

| | | | |
|---|---|---|---|
| 3,863,127 A | 1/1975 | Raver | |
| 5,247,808 A | 9/1993 | Yoshida et al. | |
| 5,424,599 A * | 6/1995 | Stroud | H02K 19/34 310/187 |
| 5,675,233 A | 10/1997 | Kaneko et al. | |
| 5,969,624 A | 10/1999 | Sakai et al. | |
| 6,297,616 B1 | 10/2001 | Kubo et al. | |

(Continued)

FOREIGN PATENT DOCUMENTS

| | | | |
|---|---|---|---|
| JP | 10145978 A * | 5/1998 | ............... H02J 7/02 |
| JP | 2008043116 A | 2/2008 | |

OTHER PUBLICATIONS

International Search Report issue in PCT/US2014/022347 on Jun. 16, 2014, 5 pages.

(Continued)

*Primary Examiner* — Vuthe Siek
(74) *Attorney, Agent, or Firm* — Cantor Colburn LLP

(57) ABSTRACT

A vehicle system is provided and includes a 12 volt alternator and a 24 volt wound rotor configured for acceptance in the 12 volt alternator.

5 Claims, 1 Drawing Sheet

(56) References Cited

U.S. PATENT DOCUMENTS

| | | |
|---|---|---|
| 6,555,992 B2 * | 4/2003 | Asao ................. H02P 9/307 |
| | | 322/28 |
| 6,771,045 B1 | 8/2004 | Keller |
| 7,554,303 B1 | 6/2009 | Kawamura |
| 7,705,491 B2 | 4/2010 | King et al. |
| 7,830,117 B2 | 11/2010 | Ambrosio et al. |
| 2003/0107351 A1 * | 6/2003 | Taniguchi ............ F02D 29/06 |
| | | 322/36 |
| 2011/0027626 A1 | 2/2011 | Lattin |
| 2012/0200242 A1 * | 8/2012 | Grady ................. H02J 7/1423 |
| | | 318/293 |

OTHER PUBLICATIONS

Written Opinion issued in PCT/US2014/022347 on Jun. 16, 2014, 7 pages.

* cited by examiner

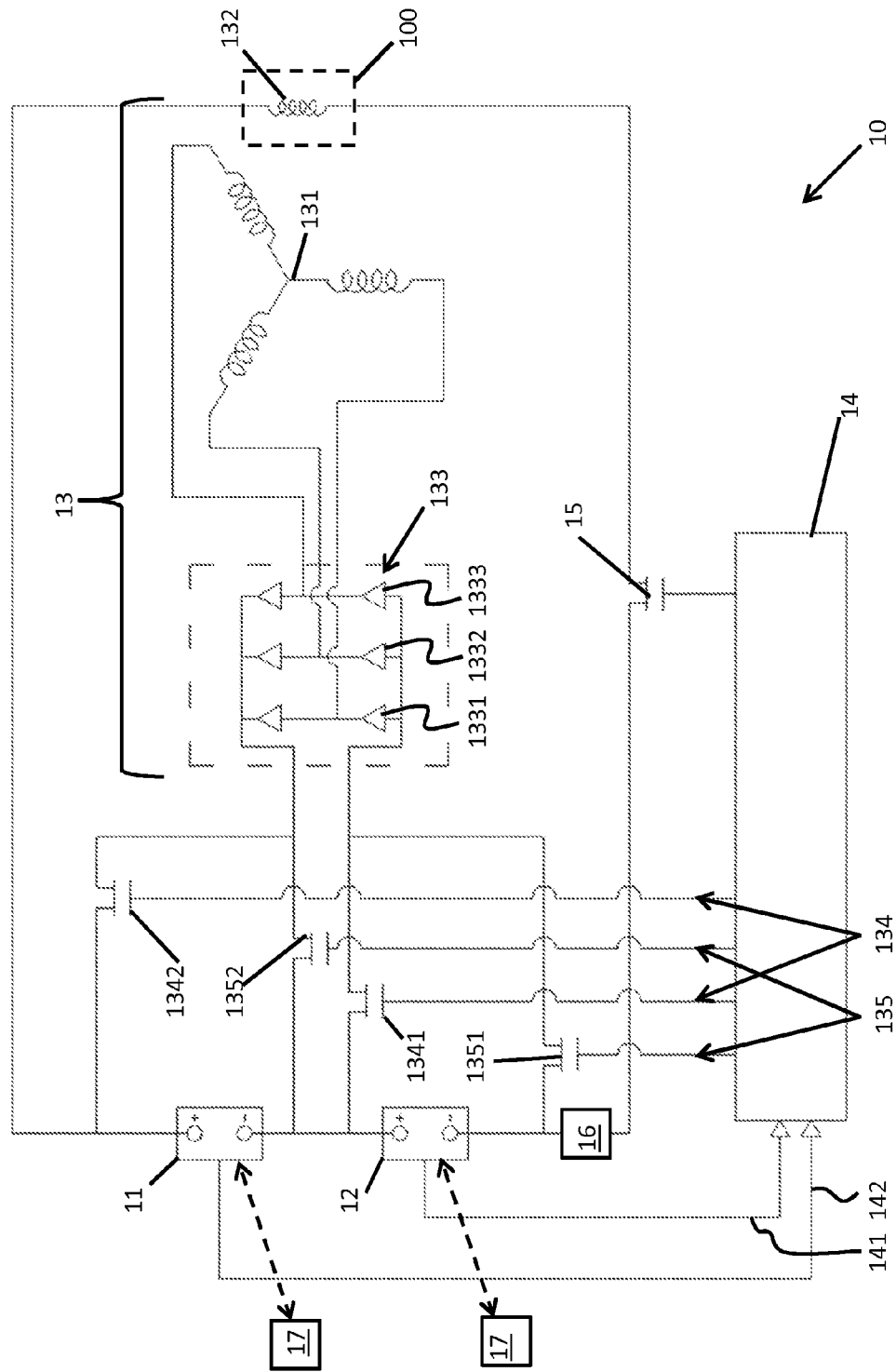

VEHICLE SYSTEM WITH BATTERIES IN SERIES

CROSS-REFERENCE TO RELATED APPLICATION

This application claims the benefit of priority to U.S. Provisional Application No. 61/791,347, which was filed on Mar. 15, 2013. The entire contents of U.S. Provisional Application No. 61/791,347 are incorporated herein by reference.

BACKGROUND OF THE INVENTION

The subject matter disclosed herein relates to a vehicle system and, more particularly, to a vehicle system with two or more batteries connected in series.

In some vehicles, a standard 12 volt alternator is connected to a 24 volt battery. This can create an undesirable condition in that alternators do not begin to produce output until they generate a higher voltage than the battery voltage. In general, a 12 volt alternator will require rotation at about 686 RPM before it generates greater than 24 volts and can begin to output a charge. This minimum engine speed for charging exceeds generally desirable idling speeds of around 600 RPM. As such, a 12 volt alternator in a 24 volt system is ineffective to charge the 24 volt battery during idling unless the idle speed is set above 686 RPM. Since setting the idle speed higher also generally entails an increase in emissions and a greater demand on fuel this is undesirable.

This problem can be addressed by using a 24 volt alternator. However, such alternators are relatively expensive and difficult to assemble. Resultantly, 24 volt alternators are not commonly selected for use in in most vehicles. Moreover, 24 volt alternators have associated resistances that greatly exceed the resistances associated with 12 volt alternators. Consequently, they tend to generate large amounts of heat that require cooling systems.

BRIEF DESCRIPTION OF THE INVENTION

According to one aspect of the invention, a vehicle system is provided and includes an alternator configured to charge a battery having a first voltage and a rotor having a rotor field winding which is powered by a second voltage.

According to another aspect of the invention, a vehicle system is provided and includes a 12 volt alternator, a series connected battery system including two 12 volt batteries, which are independently chargeable by the 12 volt alternator and multiple sub-systems powered by the series connected battery system.

According to another aspect of the invention, a vehicle system is provided for use with a vehicle including an engine operable at various speeds including idling speeds. The vehicle system includes first and second batteries connected in series to generate an excitation voltage with the engine operating at the various speeds including the idling speeds, an alternator assembly configured to generate current from the excitation voltage at the various engine speeds including the idling speeds and a controller configured to operate the alternator assembly to thereby charge each of the first and second batteries independently with the engine operating at the various speeds including the idling speeds.

According to yet another aspect of the invention, a vehicle system is provided and includes first and second batteries connected in series, an alternator having a stator winding and a rotor field winding, the stator winding being electrically coupled to the first and second batteries via a rectifier and first and second pairs of switches, respectively, the rotor field winding being connected in series with the first and second batteries and a controller configured to sense respective voltages of the first and second batteries and to close at least one of the first and second pairs of switches, respectively, in accordance with sensed respective voltages of the first and second batteries to thereby charge an associated one of the first and second batteries from the stator winding at various operating speeds, including idling speeds, of an engine coupled to the rotor field winding.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The sole FIGURE is a schematic illustration of a vehicle system with batteries connected in series in accordance with embodiments.

The detailed description explains embodiments of the invention, together with advantages and features, by way of example with reference to the drawings.

DETAILED DESCRIPTION OF THE INVENTION

With reference to the sole FIGURE, a vehicle system 10 is provided for use with a vehicle, such as a hybrid car, including an engine 100 that is operable at various speeds including idling speeds of about 600 RPM. The vehicle system 10 includes a first battery 11 and a second battery 12, which are connected in series with one another, an alternator assembly 13 and a controller 14. As will be discussed below, the first and second batteries 11 and 12 are disposed in series and may each be provided as 12 volt batteries. They may also be joined by additional batteries in series. The alternator assembly 13 may include a 12 volt alternator with a 24 volt rotor winding.

An alternator is considered a 12 volt alternator when it is configured to charge a battery that is considered a 12 volt battery. It is well known in the field that a 12 volt battery may be charged by the alternator at voltages varying from 11V to 15V based on battery and vehicle conditions. A rotor is considered a 24 volt rotor when the rotor field winding is powered by 24 volts. Again, it is well understood in the industry that a 24 volt system in a vehicle can vary from 22-30 volts depending on the charge of the batteries which is dependent on the conditions of the batteries and vehicle.

The alternator assembly 13 has a stator winding 131 and a rotor field winding 132. The stator winding 131 is wound for a number of volts (i.e., a 12 volt wound stator). The rotor field winding 132 is wound for a number of volts that is greater than and, in some cases, a multiple of the number of volts for which the stator winding 131 is wound (i.e., a 24 volt wound rotor).

The stator winding 131 may be but is not required to be a three-way stator winding and is configured to generate current at the various engine speeds including the idling speeds. The stator winding 131 is electrically coupled to the first and second batteries 11 and 12 via a rectifier 133 and first and second pairs of switches 134 and 135, respectively. More particularly, where the stator winding 131 is a three-way stator winding, the rectifier 133 may include three diodes 1331, 1332 and 1333, which are each electrically coupled to the stator winding 131 and the first and second pairs of switches 134 and 135. The first pair of switches 134 is associated with the positive and negative terminals of the first battery 11 and includes individual switches 1341 and 1342 and are controlled to charge the first battery 11 to a first voltage. The second pair of switches 135 is associated with the positive and negative terminals of the second battery 12 and includes individual switches 1351 and 1352.

The rotor field winding 132 is connected in series with and is powered by the first and second batteries 11 and 12. The rotor field winding 132 is therefore powered by a second voltage which is different than (and usually more than) the first voltage. The rotor field winding 132 includes a rotor (or an engine shaft) that is coupled to and rotated by the engine 100 at the various engine speeds including the idling speeds. Since the rotor field winding 132 is powered by battery 11, which is connected in series with battery 12, the voltage to power the rotor field winding 132 is substantially the sum of the voltages of the two batteries 11 and 12. The first and second batteries 11 and 12 may be the same voltage and in this case the voltage to power the rotor field winding (second voltage) is substantially twice the voltage of one of the batteries 11 or 12 (first voltage).

For example, the first and second batteries 11 and 12 may each be 12 volt batteries as noted above and thus, the total voltage that may be applied to the rotor field winding 132 is 24 volts. When such voltage is applied to the rotor field winding 132 (as an "excitation voltage") and the rotor is rotated by the engine 100, a flux field is generated in the stator winding 131. This flux field induces a current in the stator winding 131 that is useful in charging the first and second batteries 11 and 12 as will be described below.

With a potential for 24 volts to be applied to the rotor field winding 132, a power output of the alternator assembly 13 will be increased over comparable vehicle systems with only a single 12 volt battery. This is due to the fact that the power output of the alternator assembly 13 can be expressed as Vg, where Vg is the generated voltage of the stator winding 131. In this case, Vg=Ns*dflux/dt where Vg is the generated voltage, Ns is the number of stator turns in the stator winding 131 and dflux/dt is the rate of flux change. Flux is equal to Nr*I where Nr is the number of rotor field turns in the rotor field winding 132 and I is the rotor field current where I=Vr/Rr. Vr is the rotor field voltage (i.e., 24 volts) and Rr is the rotor field resistance.

The controller 14 may be provided as a non-transitory computer readable medium having a processing unit and storage units. The storage units have executable instructions stored thereon, which, when executed, cause the processing unit to operate as discussed herein. In particular, the controller 14 may include sensing components 141 and 142, which are coupled to the processing unit and respectively associated with each of the first and second batteries 11 and 12. The controller 14 is thus configured to sense respective voltages of the first and second batteries 11 and 12 in response to sensing signals issued by the processing unit and to thereby determine at the processing unit whether either or both of the first and second batteries 11 and 12 requires charging. Such a determination may be made, for example, when the sensed voltage in either the first or the second battery 11 or 12 is below a predefined threshold as defined in the executable instructions of the storage units.

The controller 14 may also include servo units operably coupled to the processing unit and to each of the individual switches 1341, 1342, 1351 and 1352. The controller 14 is thereby further configured to close each of the individual switches 1341, 1342, 1351 and 1352 by way of a servo command provided via the servo units. That is, in an event that the sensed voltage of the first battery 11 is determined to be low enough as to require charging of the first battery 11, the controller 14 closes the individual switches 1341, 1342 of the first pair of switches 134 to thereby charge the first battery 11 off the stator winding 131 at the various engine speeds including the idling speeds. In this case, the individual switches 1351, 1352 of the second pair of switches 135 may remain open or be closed as well to charge the second battery 12 simultaneously with the charging of the first battery 11. By the same token, in an event that the sensed voltage of the second battery 12 is determined to be low enough as to require charging of the second battery 12, the controller 14 closes the individual switches 1351, 1352 of the second pair of switches 135 to thereby charge the second battery 12 off the stator winding 131 at the various engine speeds including the idling speeds. In this case, the individual switches 1341, 1342 of the first pair of switches 134 may remain open or be closed as well to charge the first battery 11 simultaneously with the charging of the second battery 11.

As shown in the sole FIGURE, the vehicle system 10 may further include an additional switch 15. The additional switch 15 may be provided as a metal-oxide-semiconductor field effect transistor (MOSFET) and is connected in series between the first and second batteries 11 and 12 and the rotor field winding 132. The additional switch 15 is operably coupled to the controller 14 servo units. The controller 14 is thereby further configured to control current flowing through the rotor field winding 132 via the additional switch 15 by duty cycling the additional switch 15 in accordance with, for example, the respective sensed voltages of the first and second batteries 11 and 12.

The configuration described above with the first and second batteries 11 and 12 being 12 volt batteries and being connected in series presents at least the following advantages over conventional configurations. Where a 12 volt alternator is connected to a 24 volt battery, the 12 volt alternator will not start producing output until the stator windings generate voltage that is higher than the battery voltage when taking into account the voltage drops at the rectifier (i.e., for a 24 volt battery, the 12 volt alternator will produce output at 26 volts). Thus, for a 12 volt alternator with a 12 volt battery, the alternator will start generating output at about 400 RPM with an estimated 2.74 pulley ratio between the engine 100 and the alternator. However, for a 12 volt alternator with a 24 volt battery, the alternator will not start generating output until about 686 RPM. This may be problematic since a vehicle may idle at around 600 RPM and there may be a need for recharging capability at idling speeds.

In the configuration described above, the alternator assembly 13 may be provided as a 12 volt alternator. Since each of the first and second batteries 11 and 12 (which together provide 24 volts to the rotor field winding 132) may only be 12 volt batteries, the alternator assembly 13 may start producing output sufficient to charge each of the first or the second battery 11 or 12 at the idling speeds of about 600 RPM. At this point, such charging requires that the alternator assembly 13 generates only about 14 volts (i.e., 12 volts for the first or the second battery 11 or 12 and the voltage drop across the rectifier 133).

In addition, if one of the first and second batteries 11 and 12 dies, the remaining one of the first and second batteries 11 and 12 may be used to power the rotor field winding 132.

In accordance with further embodiments, one or more additional batteries 16 may be provided in series with the first and second batteries 11 and 12. In this case, although it is not shown in the sole FIGURE, the alternator assembly 13 may be configured with additional components to allow for the independent charging of each of the one or more additional batteries 16, as described above.

In accordance with still further embodiments, multiple sub-systems 17 may be operatively coupled to either of the first or the second batteries 11 or 12. Such sub-systems 17 may be run at, for example, 12 volts while the above-described vehicle system 10 is run at up to 24 volts (or, in some embodiments, up to 36, 48 or more volts with additional batteries or with higher voltage batteries). The multiple sub-systems may include any electrical systems in a vehicle, such as the headlights, the interior lights, the navigation system, etc.

To the extent that the rotor associated with the rotor field winding 132 runs hotter than normal due to the increased current applied thereto, a number of rotor field turns of the rotor field winding 132 can be increased and/or the width of the wire used in the rotor field winding 132 can be decreased. Alternatively, a number of turns in the stator winding 131 can be reduced, while the rotor outer diameter can be increased and a number of rotor field turns of the rotor field winding 132 can be increased as well. As another alternative, the rotor outer diameter can be decreased, the width of the wire used in the rotor field winding 132 can be decreased, the stator winding inner diameter can be shrunk and the width of the wire used in the stator winding 131 can be increased.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A vehicle system, comprising:
    an alternator configured to independently charge a first battery having a first voltage and a second battery connected in series with the first battery; and
    a rotor having a rotor field winding which is powered by a second voltage of the first and second batteries, wherein the second voltage is greater than the first voltage.

2. The vehicle system of claim 1, wherein the first and second batteries are 12 volt batteries.

3. The vehicle system of claim 2, wherein the rotor is a 24 volt wound rotor and the alternator further comprising a 12 volt wound stator.

4. The vehicle system of claim 1, wherein the second voltage is substantially twice the first voltage.

5. The vehicle system according to claim 1, further comprising one or more additional batteries in series with the first and second batteries to power the rotor field winding.

* * * * *